United States Patent
Su et al.

(10) Patent No.: US 11,732,835 B2
(45) Date of Patent: Aug. 22, 2023

(54) GIMBAL AND GIMBAL CONTROL METHOD

(71) Applicant: SZ DJI TECHNOLOGY CO., LTD., Shenzhen (CN)

(72) Inventors: Tie Su, Shenzhen (CN); Paul Pan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 174 days.

(21) Appl. No.: 17/224,342

(22) Filed: Apr. 7, 2021

(65) Prior Publication Data

US 2021/0222821 A1 Jul. 22, 2021

Related U.S. Application Data

(63) Continuation of application No. 16/654,646, filed on Oct. 16, 2019, now Pat. No. 10,976,002, which is a continuation of application No. PCT/CN2017/081537, filed on Apr. 21, 2017.

(51) Int. Cl.
| | | |
|---|---|---|
| *F16M 11/12* | (2006.01) | |
| *F16M 13/04* | (2006.01) | |
| *G03B 17/56* | (2021.01) | |
| *F16M 11/18* | (2006.01) | |

(52) U.S. Cl.
CPC .......... *F16M 11/123* (2013.01); *F16M 13/04* (2013.01); *G03B 17/561* (2013.01); *F16M 11/18* (2013.01); *F16M 2200/04* (2013.01)

(58) Field of Classification Search
CPC .... G03B 17/56; G03B 17/561; G03B 17/563; F16M 13/00; F16M 13/04; F16M 13/06; F16M 11/12; F16M 11/121; F16M 11/123; F16M 11/125; F16M 11/2007; F16M 11/2035; F16M 11/205; F16M 11/2042; F16M 11/2057

See application file for complete search history.

(56) References Cited

U.S. PATENT DOCUMENTS

| | | |
|---|---|---|
| 9,030,149 B1 | 5/2015 | Chen et al. |
| 2015/0168953 A1 | 6/2015 | Smid |

FOREIGN PATENT DOCUMENTS

| | | |
|---|---|---|
| CA | 2928413 A1 | 4/2017 |
| CN | 103994311 A | 8/2014 |
| CN | 104704279 A | 6/2015 |
| CN | 104965527 A | 10/2015 |
| CN | 204904097 U | 12/2015 |

(Continued)

OTHER PUBLICATIONS

The World Intellectual Property Organization (WIPO) International Search Report for PCT/CN2017/081537 dated Jan. 10, 2018 5 pages.

*Primary Examiner* — Clayton E. LaBalle
*Assistant Examiner* — Fang-Chi Chang
(74) *Attorney, Agent, or Firm* — Anova Law Group, PLLC

(57) ABSTRACT

A gimbal for supporting a load includes at least three rotatably coupled driving axis assemblies and a controller. Each driving axis assembly includes a driving device and a joint arm configured to rotate when driven by the driving device. The controller is configured to control the gimbal to limit a rotation of a first driving axis assembly, and adjust positions of a second driving axis assembly and a third driving axis assembly, respectively, relative to the load, such that the gimbal maintains a forward orientation of the load.

20 Claims, 12 Drawing Sheets

(56) References Cited

FOREIGN PATENT DOCUMENTS

| | | | |
|---|---|---|---|
| CN | 105659020 | A | 6/2016 |
| CN | 106090549 | A | 11/2016 |
| GB | 611037 | A | 10/1948 |
| WO | 2016154996 | A1 | 10/2016 |

GIMBAL AND GIMBAL CONTROL METHOD

CROSS-REFERENCE TO RELATED APPLICATION

This application is a continuation of U.S. application Ser. No. 16/654,646, filed on Oct. 16, 2019, which is a continuation application of International Application No. PCT/CN2017/081537, filed on Apr. 21, 2017, the entire contents of all of which are incorporated herein by reference.

TECHNICAL FIELD

The present disclosure relates to the technical field of gimbals and, more particularly, to a gimbal and a gimbal control method.

BACKGROUND

When photographing is performed manually, to maintain the stability of an imaging device such as a camcorder or a camera, a gimbal is typically used to fix the imaging device, such that when a user handholds and moves the gimbal, the stability of the imaging device can still be maintained.

Currently, to meet different requirements of photographing scenes, the imaging device typically can change between a high position and a low position. Correspondingly, currently available gimbals can have an invertible mode to meet the two high and low positions. For example, in one of the currently available gimbals, when disposed at a typical suspension position, the imaging device on the gimbal is at an upright attitude and is located under the gimbal. When switched to a high position, a handheld rod of the gimbal may be rotated 180° around a pitch axis to turn the imaging device to a position above the gimbal. The imaging device is turned into an inverted attitude.

However, when a currently available gimbal is changed into an invertible mode, the images captured by the imaging device may be turned upside down. Adjustments through software need to be performed later to restore the images to an upright attitude. Further, during the process when the gimbal is inverted, the gimbal may experience non-stop continuous rotation because a joint angle may be deadlocked.

SUMMARY

In accordance with the present disclosure, there is provided a gimbal for supporting a load. The gimbal includes at least three rotatably coupled driving axis assemblies. Each driving axis assembly includes a driving device and a joint arm configured to rotate when driven by the driving device. The gimbal also includes a controller configured to control the gimbal to limit a rotation of at least one of the three driving axis assemblies during a rotation of the gimbal.

In accordance with the present disclosure, there is also provided a method for controlling a gimbal configured to support a load. The method includes detecting a rotation status of the gimbal. The method also includes controlling the gimbal to limit a rotation of at least one driving axis assembly based on the rotation status.

The present disclosure provides a gimbal and a gimbal control method. The gimbal may be configured to support a load. The gimbal may include at least three rotatably coupled driving axis assemblies. Each driving axis assembly may include a driving device and a joint arm driven by the driving device. The joint arm may rotate relative to the driving device when driven by the driving device. The gimbal may also include a controller configured to control the gimbal to limit the rotation of at least one driving axis assembly during the rotation of the gimbal. The disclosed gimbal may adjust its attitude in a relatively large range. For example, when the position of the load is adjusted from a position under the gimbal in a portable suspension state to a position above the gimbal in an upside down inverted state, the gimbal may maintain a normal rotation, and may avoid the occurrence of the non-stop continuous rotation due to the deadlock of a joint angle.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

LIST OF ELEMENTS

Figure 1:
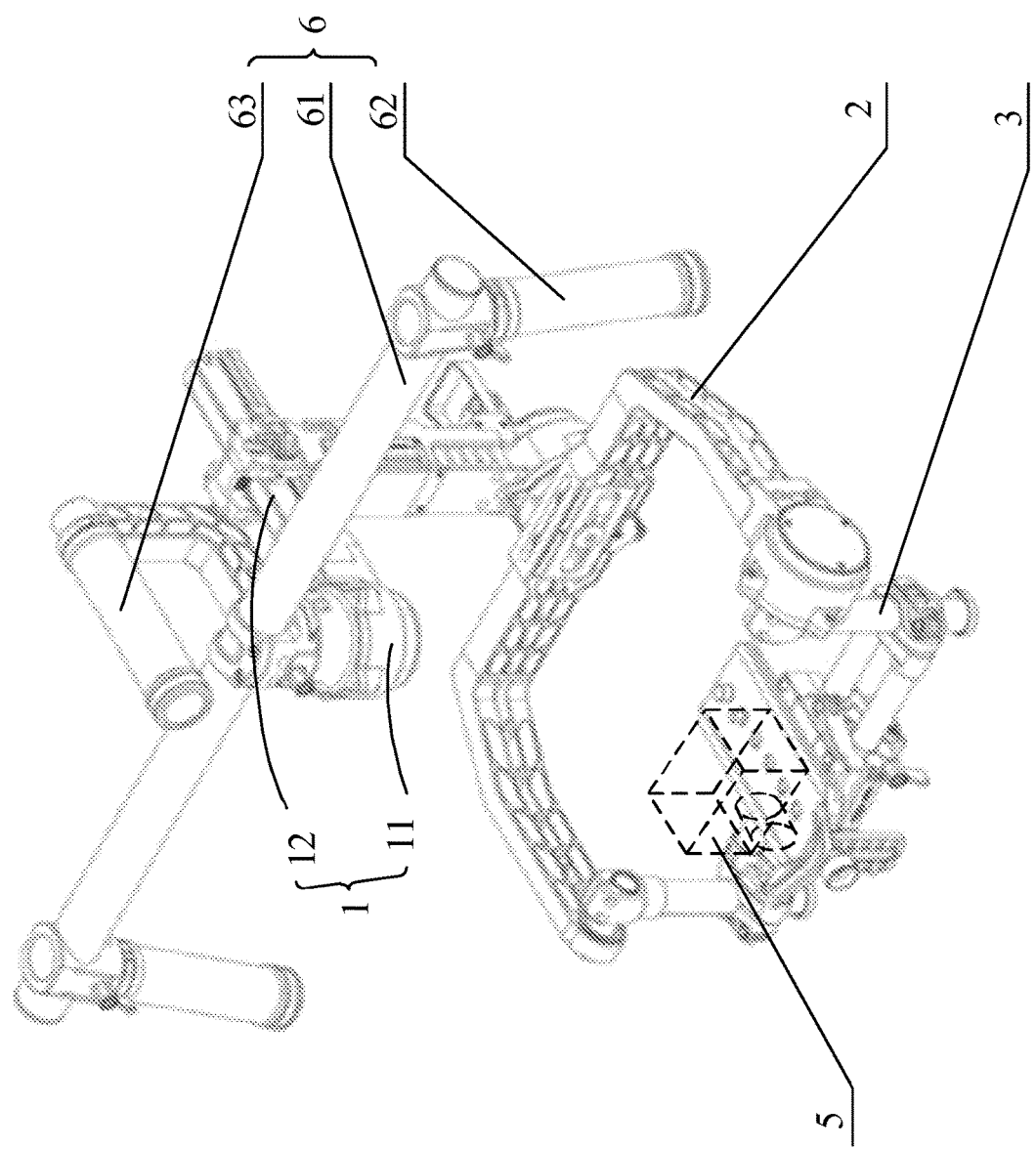
FIG. 1 is a schematic illustration of a structure of a gimbal, according to an example embodiment.

1—yaw axis assembly;
2—roll axis assembly;
3—pitch axis assembly;
11—driving device;
13—joint arm;

4—controller;
5—load;
6—handle assembly;
15, 51—inertial measurement unit ("IMU");
17, 21—angle sensor;
61—supporting rod;
62—handholding rod;
63—handle.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

It is understood that embodiments described below are only for a person having ordinary skills in the art to better understand the technical solutions provided in the present disclosure, and are not intended to limit the scope of the present disclosure.

Further, it should be understood that in various embodiments of the present disclosure, the reference numbers of the steps do not necessarily mean that the steps have to be executed in the order of the reference numbers. The order for executing the steps should be configured based on the functions of the steps and the internal logic. Thus, the reference numbers of the steps do not limit, in any manner, the execution of the various steps of the disclosed embodiments.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Figure 2:
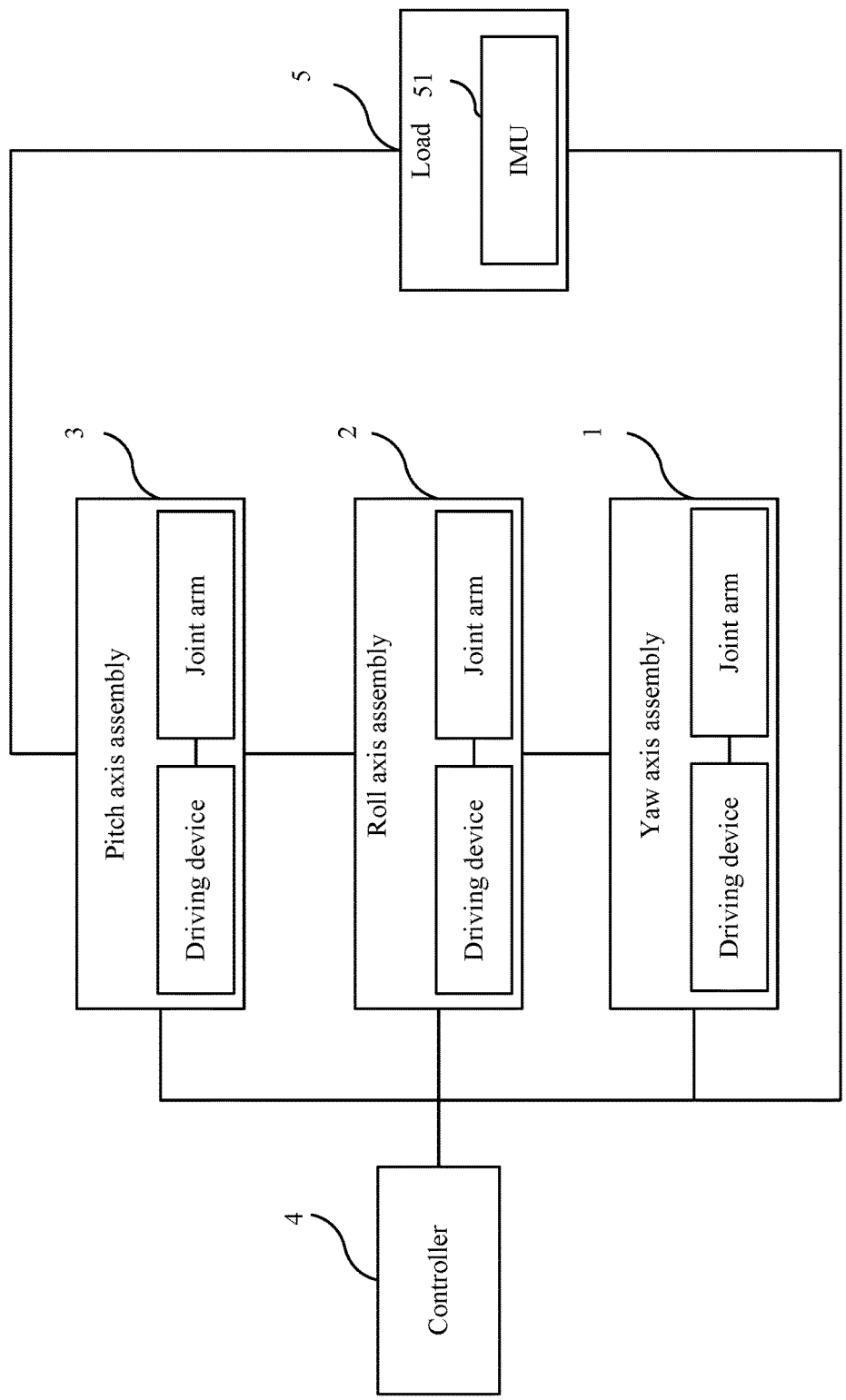
FIG. 2 is a schematic diagram of a structure of the gimbal, according to an example embodiment.

FIG. 1 is a schematic illustration of a structure of a gimbal. FIG. 2 is a schematic diagram of the structure of the gimbal. As shown in FIG. 1 and FIG. 2, the gimbal may be configured to support a load 5. The gimbal may include at least one driving axis assembly. For example, the gimbal may include at least three rotatably coupled driving axis assemblies. Each driving axis assembly may include a driving device and a joint arm driven by the driving device. The joint arm may rotate when driven by the driving device. The gimbal may also include a controller 4 configured to control the gimbal to limit the rotation of at least one driving axis assembly during a rotation of the gimbal.

The load 5 supported by the gimbal typically includes an imaging device or other devices such as a scanner or a surveying instrument that may use the gimbal to stabilize the attitude of the devices. A load such as the imaging device may need to maintain a stable attitude when the load is moved and operated while having an ability to be freely adjusted for the horizontal or pitch angle. To meet these requirements, the load 5 may be mounted on the gimbal. The gimbal may compensate for the movement and displacement of the load 5. Accordingly, a normal operating attitude for the load 5 may be maintained. The gimbal may include at least three rotatably coupled driving axis assemblies. A joint arm in each driving axis assembly may be driven by a driving device to rotate relative to a rotation axis, thereby changing the relative position and relative angle between two adjacent driving axis assemblies. By configuring the direction of the rotation axis of each driving axis assembly, the attitude of the gimbal in each direction may be adjusted when the driving assemblies rotate relative to one another.

In some embodiments, when the load 5 is in operation, a user may need to adjust, in a wide range, the relative positions between various elements of the gimbal and the load 5. For example, the load 5 may be adjusted from a position located at the bottom of the gimbal to a position located at the top of the gimbal, which may cause a relatively large rotation angle for at least one of the driving axis assemblies. Among the driving axis assemblies, if a rotation axis of a driving axis assembly coincides or nearly coincides with a rotation axis of another driving axis assembly, i.e., when the joint angle of the driving device of each driving axis assembly is at or close to 90 degrees, the gimbal cannot determine the motion attitude and motion trend of the driving axis assemblies. As a result, the driving axis assemblies may be unable to rotate or may rotate uncontrollably. In other words, a universal joint of a driving axis assembly may be deadlocked, which may cause the gimbal to experience non-stop continuous rotation. Therefore, the gimbal may include a controller 4 configured to control the rotation of each driving axis assembly during the rotation of the gimbal, to limit the rotation of at least one of the driving axis assemblies. As a result, the driving axis assemblies may maintain normal rotations while the attitude of the gimbal is adjusted in a relatively large range, thereby avoiding the uncontrollable rotation of the driving axis assemblies. Through the controls by the controller 4, the motion and the attitude of the load may be compensated for, such that the load 5 may maintain normal attitude and position in operation.

In some embodiments, the load 5 supported by the gimbal may include an inertial measurement unit ("IMU") 51. The IMU 51 may provide the current rotation angle and position of the load 5, such that the controller 4 may stabilize each driving axis assembly based on the rotation angle and position detected by the IMU 51, to maintain the attitude and the position of the load 5. In some embodiments, the controller 4 may control the attitude and the position of the load 5 using other measurement devices.

In some embodiments, to enable the controller 4 to control the driving axis assemblies, the gimbal may also include an electrical speed control (not shown). The electrical speed control may be connected with the controller 4 and each driving device included in each driving axis assembly. The controller 4 may control the operation of each driving device, such as the rotation angle and rotation speed of the driving device, through the electrical speed control. In some embodiments, the driving device may include a motor.

In some embodiments, to enable the gimbal to rotate in all directions, the gimbal may include three driving axis assemblies: a yaw axis assembly 1, a roll axis assembly 2, and a pitch axis assembly 3. The yaw axis assembly 1 may rotate around a yaw axis, the roll axis assembly 2 may rotate around a roll axis, and the pitch axis assembly 3 may rotate around a pitch axis. Thus, the three driving axis assemblies may rotate around three perpendicular axes, thereby realizing the yaw, roll, and pitch operations of the gimbal. The load 5 supported by the gimbal can therefore be adjusted to face different directions.

In some embodiments, to enable the gimbal to rotate in various directions, the yaw axis assembly 1, the roll axis assembly 2, and the pitch axis assembly 3 may be rotatably coupled together in sequence. For example, the driving device 11 of the yaw axis assembly 1 may be located at a top position of the gimbal. The roll axis assembly 2 may be connected with the yaw axis assembly 1. The pitch axis assembly 3 may be connected with the roll axis assembly 2. The load 5 may be supported by the joint arm of the pitch axis assembly 3. A handholding rod or other fixing devices may be disposed along the yaw axis. To enable the gimbal to rotate in a relatively large range, the controller 4 may be configured to control the gimbal during the rotation of the gimbal to limit the rotation of the driving device 11 of the yaw axis assembly 1. When the driving device 11 of the yaw axis assembly 1 is limited, the gimbal may be temporarily changed from a three-axis gimbal (or tri-axis gimbal) formed by the yaw axis assembly 1, the roll axis assembly 2, and the pitch axis assembly 3, into a two-axis (or dual-axis) gimbal in which only the roll axis assembly 2 and the pitch axis assembly 3 may be rotated. The controller 4 may control the gimbal in a two-axis mode. Because in a two-axis mode, the roll axis assembly 2 and the pitch axis assembly 3 can only rotate around two axes, the two axes would not coincide with one another. Thus, the uncontrollable rotation caused by the deadlock of a universal joint can be avoided, thereby maintaining the normal rotations of the gimbal.

In some embodiments, in the gimbal, the load 5 may be supported by the joint arm of the pitch axis assembly 3. For illustration purposes, the controller 4 may be described herein as limiting the rotation of the driving device 11 of the yaw axis assembly 1 that is farthest to the load during the rotation of the gimbal. It is understood that depending on the gimbal structure or the actual needs, the controller 4 may be configured to limit the rotation of the driving device of the pitch axis assembly 3. The detailed realization processes may be similar to limiting the rotation of the yaw axis assembly 1.

In some embodiments, when the gimbal is temporarily operated in a two-axis mode, during a rotation process of the gimbal, and based on a determination that the pitch axis assembly 3 that supports the load has rotated to a position above the driving device 11 of the yaw axis assembly 1, the controller 4 may be configured to control the roll axis assembly 2 to rotate relative to the yaw axis assembly 1, so as to adjust the position of the load 5 supported by the pitch axis assembly 3 to face forwardly.

Figure 3:
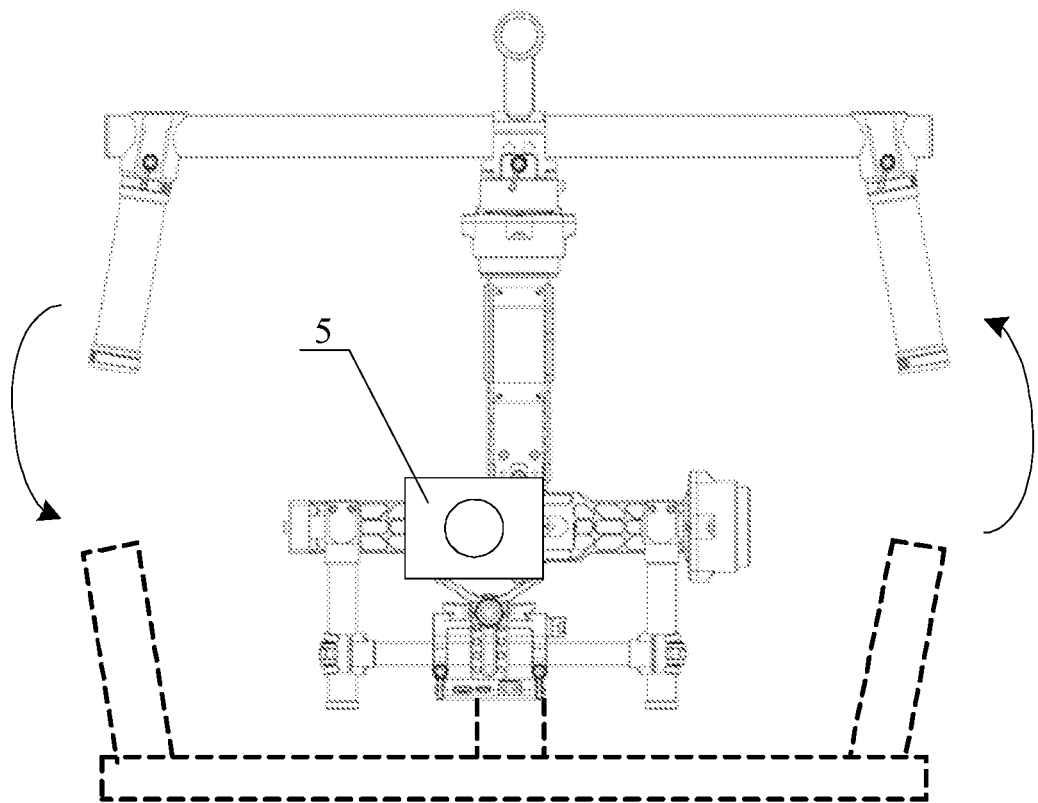
FIG. 3 is a schematic illustration of a rotation of the gimbal shown in FIG. 1, according to an example embodiment.
Figure 4A:
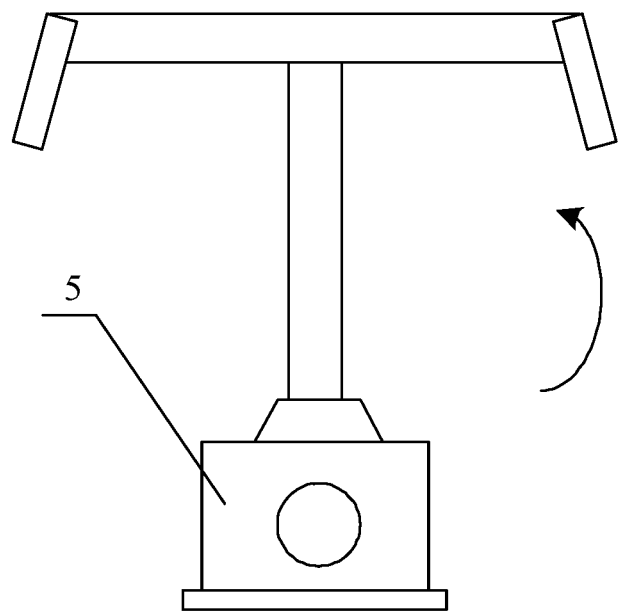
FIG. 4a is a schematic illustration of an initial position of the gimbal shown in FIG. 3, according to an example embodiment.
Figure 4B:
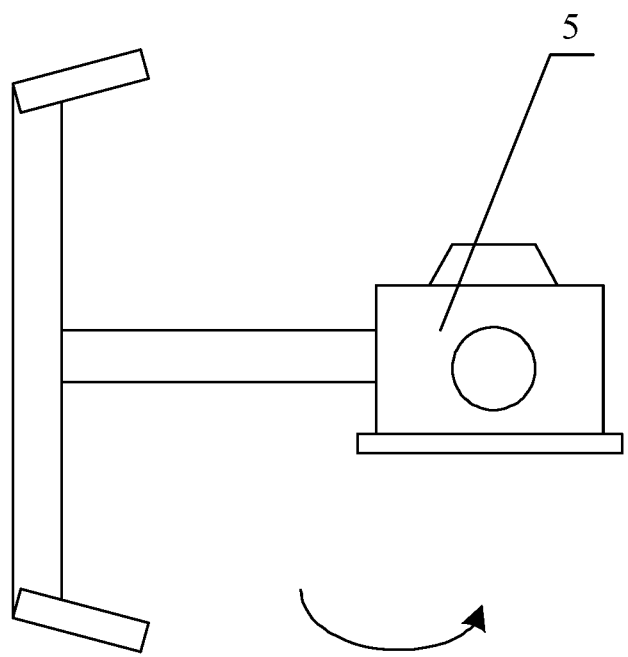
FIG. 4b is a schematic illustration of a position of the gimbal shown in FIG. 3 during the rotation, according to an example embodiment.
Figure 4C:
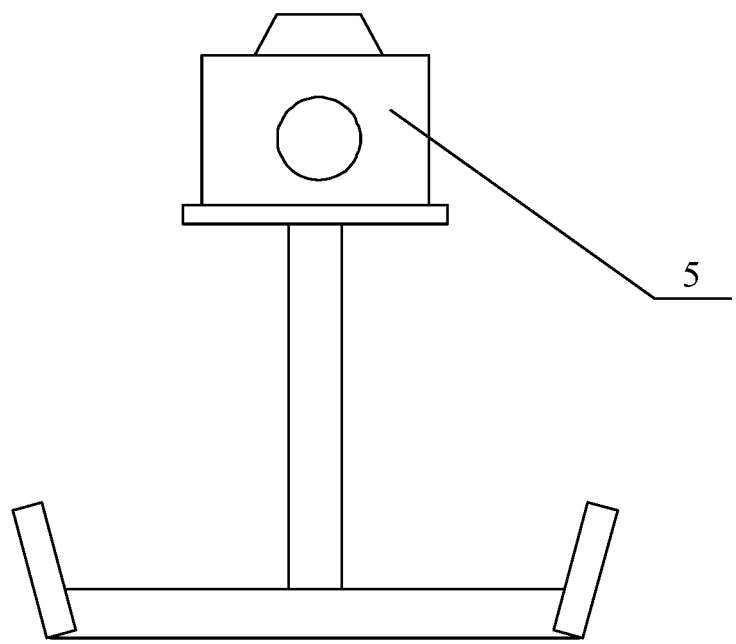
FIG. 4c is a schematic illustration of the position of the gimbal shown in FIG. 3 after the rotation is completed, according to an example embodiment.

An example adjustment will be described blow. In the example, the attitude of the gimbal is adjusted such that the position of the load 5 is adjusted from a position located below the gimbal to a position located above the gimbal. In other words, the gimbal is adjusted from a suspension state to an inverted state. The load 5 may be an imaging device, such as a camcorder or a camera. A user may adjust the position of the load 5 manually through handholding. Specifically, for example, the user may adjust the position of the load 5 from a position below the gimbal in a portable suspension state to a position above the gimbal in an upside down inverted state. In other words, the load 5 may be switched between a high position and a low position. FIG. 3 is a schematic illustration of a rotation of the gimbal shown in FIG. 1. As shown in FIG. 1-FIG. 3, a user may handhold the gimbal and rotate the gimbal around the roll axis, thereby changing the high or low position of the load 5 relative to the gimbal. In this state, because the pitch axis assembly 3 may support the load 5, the pitch axis assembly 3 may also move as the gimbal rotates, and may rotate to a position above the driving device 11 of the yaw axis assembly 1. FIG. 4*a* is a schematic illustration of an initial position of the gimbal shown in FIG. 3. FIG. 4*b* is a schematic illustration of the position of the gimbal shown in FIG. 3 during rotation. FIG. 4*c* is a schematic illustration of the position of the gimbal shown in FIG. 3 when the rotation is completed. In the initial portable suspension state, the load 5 may be located below the gimbal, and the load 5 may face forwardly. As shown in FIG. 4*a*, to change the position of the load 5 from the portable suspension state to the upside down inverted state, a user may handhold the gimbal and may cause the gimbal to rotate around the roll axis. Based on a determination that the load 5 has rotated to a position where the joint angle of the driving device of the driving axis assembly is close to or at 90 degrees, to avoid the deadlock of the universal joint when the joint angle is at 90 degrees, which may cause the gimbal to uncontrollably rotate, the controller 4 may limit the movement of the yaw axis assembly 1. The controller 4 may compensate for and adjust the positions of the other two driving axis assemblies relative to the load, such that the gimbal may maintain the forward facing position of the load 5, as shown in FIG. 4*b*. When the gimbal rotation around the roll axis is completed, the position of the load 5 may be changed to a position above the gimbal, and the load 5 may still in a forward facing state under the motion compensation of the gimbal, as shown in FIG. 4c. When the position of the load 5 is above the gimbal, it may indicate that the height of the load 5 is greater than the height of the driving device 11 of the yaw axis assembly 1.

In some embodiments, to control the position and attitude of the load 5, the controller 4 may control the roll axis assembly 2 to rotate relative to the yaw axis assembly 1, thereby adjusting the position of the load 5 supported by the pitch axis assembly 3 to a forward facing position. The forward facing position of the load 5 may be the position and attitude of the load 5 under a normal operating state. Because the roll axis assembly 2 rotates relative to the yaw axis assembly 1, when the load 5 rotates around the roll axis, the roll axis assembly 2 may suitably compensate for the rotation of the load 5, such that the load 5 is maintained in the forward facing position. For example, when the load 5 is an imaging device, through the rotation of the roll axis assembly 2, the imaging device may be maintained in the forward facing position, such that the imaging device may capture upright images or videos, which may not require additional processing to rotate upside-down images or videos.

In some embodiments, the rotation angle of the yaw axis assembly 1 relative to the roll axis assembly 2 may be greater than or equal to 360 degrees, such that the load 5 may be rotated from a portable suspension position below the gimbal to an upside down inverted position above the gimbal.

In some embodiments, various methods may be used to limit the rotation of the yaw axis assembly 1 of the gimbal. For example, the gimbal may include a locking mechanism (not shown). When the controller 4 detects that the locking mechanism is in a locked state, the controller 4 may shut off the driving device 11 to limit the rotation of the yaw axis assembly 1, and to control the gimbal in a two-axis mode. In some embodiments, the controller 4 may independently control and compensate for the motion of the yaw axis assembly 1 to maintain the yaw axis assembly 1 in a stable, fixed (e.g., not moving) position.

In some embodiments, the gimbal may include the locking mechanism. When the gimbal starts to rotate, the locking mechanism may lock the rotation of the joint arm 13 of the yaw axis assembly 1 driven by the driving device 11, or may lock the driving device 11 such that the driving device 11 cannot rotate. In this state, the controller 4 may obtain the locked state of the locking mechanism, and may control the driving device 11 to shut off, to avoid rotation jamming of the driving device 11. The controller 4 may control the gimbal in the two-axis mode, and may adjust the control logics and control methods accordingly.

In some embodiments, the locking mechanism may include a mechanical locking device or an electrically controlled locking mechanism. The locking mechanism may be operated by a user to perform manual locking operations. In some embodiments, the locking mechanism may be triggered before the gimbal rotates or when the gimbal starts to rotate. As such, when the gimbal starts to rotate, the locking mechanism may lock the rotation of the joint arm 13 of the yaw axis assembly 1 driven by the driving device 11. The controller 4 may obtain the locked state of the locking mechanism, and control the driving device 11 to shut off, to thereby limit the rotation of the driving device 11 of the yaw axis assembly 1. When the user handholds the gimbal, and adjusts the position of the load 5 from a position below the gimbal in a portable suspension state to a position above the gimbal in an upside down inverted state, the rotation of the yaw axis assembly 1 may be limited, and may not provide motion compensation for the relative position of the load 5. Only the roll axis assembly 2 and the pitch axis assembly 3 may rotate to compensate for the motion of the load 5, such that the load 5 may be maintained in the forward facing state while the user rotates the gimbal. In some embodiments, the mechanism locking device may include any suitable locking mechanisms such as a locking pin, a snap-fit mechanism (or a buckle, a latch), etc. The electrically controlled locking mechanism may include a control button (or key), and a snap-fit mechanism, a buckle, a latch, or a locking element that may be controlled by the control button.

In some embodiments, when the controller 4 limits the rotation of the driving device 11 of the yaw axis assembly 1, the controller 4 may directly control the driving device 11 of the yaw axis assembly 1 to stop rotation and control the gimbal in the two-axis mode. In this state, the gimbal operates in a two-axis mode, which includes the roll axis assembly and the pitch axis assembly 3, and can avoid the deadlocking of a universal joint.

In some embodiments, the gimbal may not include the locking mechanism. The controller 4 may directly receive an input command from a user and may control the driving device 11 of the yaw axis assembly 1 to stop rotation and the controller may switch to the two-axis mode to control the gimbal.

In some embodiments, the yaw axis assembly 1 may include an angle sensor 17 (shown in FIG. 5) configured to detect a rotation angle of the driving device 11 of the yaw axis assembly 1. The angle sensor 17 may be a touch or non-touch sensor, such as an angle encoding sensor, a Hall effect sensor, or a potentiometer.

In some embodiments, when the rotation of the gimbal is completed or when the load 5 rotates to a position right above the driving device 11 of the yaw axis assembly 1, to restore the three-axis control mode, the limitation on the rotation of the driving device 11 of the yaw axis assembly 1 may be released. For example, the locking of the yaw axis assembly 1 by the locking mechanism may be released. In this state, if the controller 4 determines, through the angle sensor 17, that the rotation angle of the driving device 11 of the yaw axis assembly 1 is greater than or equal to a predetermined angle, the controller 4 may restore the control of the yaw axis assembly 1, and thereby controlling the gimbal in the three-axis mode.

In some embodiments, when the load 5 rotates to a position right above the driving device 11 of the yaw axis assembly 1, the load 5 is in an upside down inverted state. To use the three-axis mode, the limitation on the rotation of the driving device 11 of the yaw axis assembly 1 may be released. For example, the locking of the yaw axis assembly 1 by the locking mechanism may be released. If the load 5 rotates to deviate for a predetermined angle relative to the position right above the driving device 11 of the yaw axis assembly 1, the controller 4 may obtain the rotation angle through the angle sensor 17, release the limitation on the rotation of the driving device 11 of the yaw axis assembly 1, and control the gimbal in the three-axis mode. In some embodiments, the predetermined angle may be 5 degrees. That is, based on a determination that the load 5 deviates in any direction for 5 degrees relative to the position right above the driving device 11 of the yaw axis assembly 1, the controller 4 may release the limitation on the rotation of the yaw axis assembly 1, and restore the three-axis gimbal operation state for the gimbal. In some embodiments, releasing the locking mechanism may be achieved through manual operations.

In some embodiments, the locking of the yaw axis assembly 1 may be released when the gimbal moves to an inverted mode and when the load 5 has rotated to a forward facing state.

In some embodiments, in the above method in which the controller 4 limits the rotation of the yaw axis assembly 1 through the locking mechanism, and controls the gimbal at the start of a rotation of the gimbal, to thereby limit the rotation of the driving device 11 of the yaw axis assembly 1, the limitation of the rotation of the driving device 11 of the yaw axis assembly 1 may be realized through a manual operation method or through a controller triggering method. The method for limiting the rotation is simple and reliable, and is easy to implement.

Figure 5:
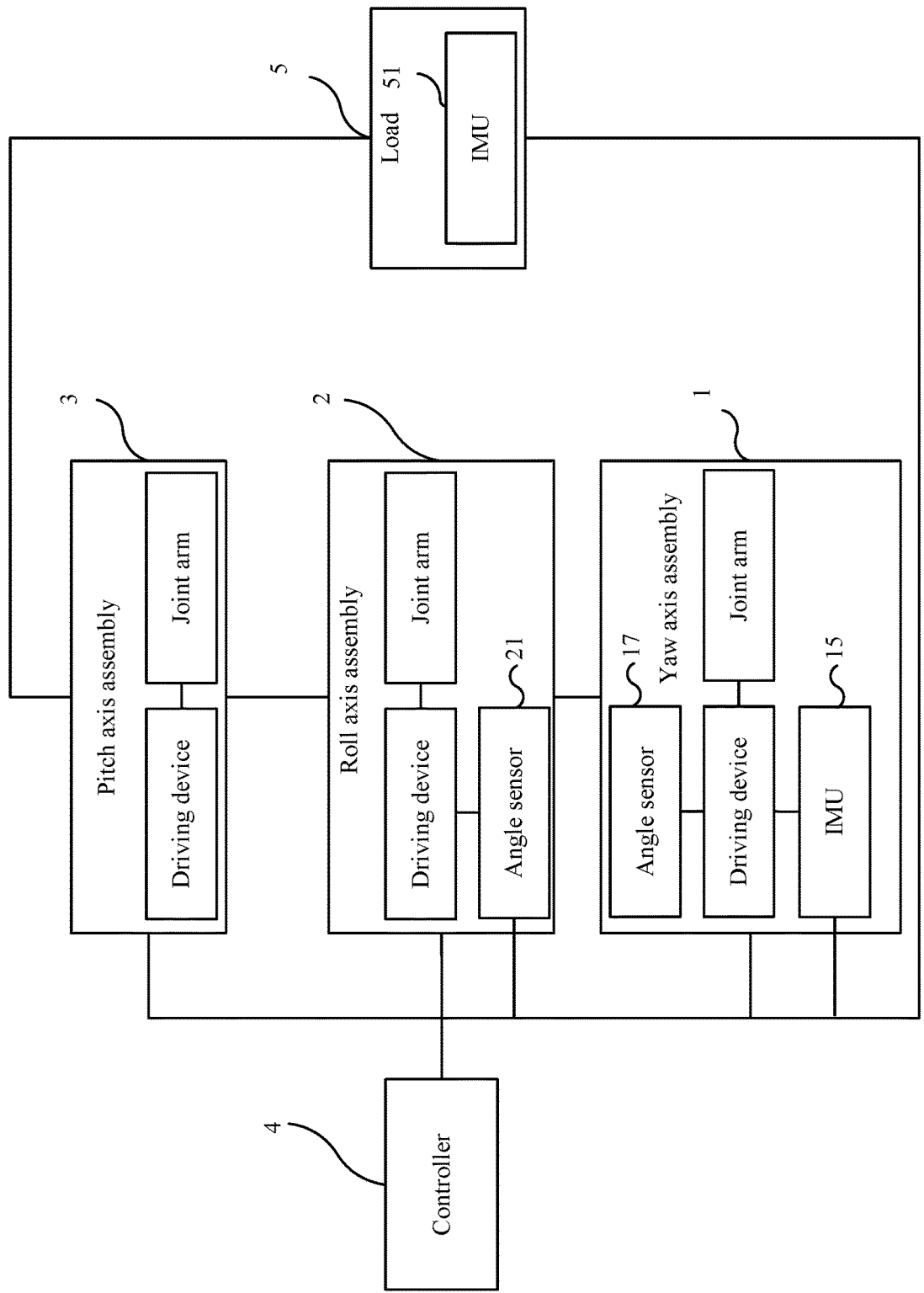
FIG. 5 is a schematic diagram of a structure of another gimbal, according to another example embodiment.

FIG. 5 is a schematic diagram of a structure of the gimbal. As shown in FIG. 1, FIG. 3, FIG. 4a, FIG. 4b, and FIG. 4c, in some embodiments, the controller may independently control the yaw axis assembly 1. For example, when the roll axis assembly 2 and the pitch axis assembly 3 of the gimbal operate in a two-axis gimbal mode to avoid the deadlocking of a universal joint, the yaw axis assembly 1 may still be controlled independently, such that the gimbal may compensate for the rotation of the load 5 to maintain the load 5 in a forward facing position.

In some embodiments, while the load 5 rotates around the roll axis from a position below the gimbal to a position above the gimbal, the limitation of the driving device may not be performed until the joint angle of the driving device of the driving axis assembly of the gimbal is close to a range that may cause the deadlocking of a universal joint. When the joint angle is at a value outside of the range, the three driving axis assemblies of the gimbal may be maintained in normal operating states, rather than being limited in rotations. During the rotation of the load 5, the rotation angle of the driving device of the roll axis assembly 2 may be relatively large, which may reach about 180 degrees, and the rotation angles of the other driving axis assemblies may be relatively small. As a result, only the joint angle of the roll axis assembly 2 may need to be detected. Accordingly, the roll axis assembly 2 may include an angle sensor 21. The controller 4 may obtain a joint angle of the driving device of the roll axis assembly 2 detected by the angle sensor 21 included in the roll axis assembly 2. Based on a determination that the joint angle is within a predetermined value range, the controller 4 may control the gimbal to limit the rotation of the driving device 11 of the yaw axis assembly 1.

In some embodiments, when the load 5 rotates from a position below the gimbal in a portable suspension state around the roll axis to a position above the gimbal in an upside down inverted state, the rotation angle of the load 5 may exceed 180 degrees. To enable the load 5 to rotate in a large range around the roll axis, a position limiting device or a position limiting mechanism provided on the roll axis assembly 2 may be changed or eliminated, such that the rotation angle of the yaw axis assembly 1 relative to the roll axis assembly 2 may be greater than or equal to 360 degrees.

In some embodiments, the roll axis assembly 2 may include an independent angle sensor 21. The angle sensor 21 may be configured to obtain or detect the joint angle of the driving device of the roll axis assembly 2. The joint angle may be used by the controller 4 to control the rotation of the driving device 11 of the yaw axis assembly 1. When the joint angle detected by the angle sensor 21 is within a predetermined value range, it may indicate that the driving axis assembly has rotated to a range of angles that may cause the deadlock of a universal joint. In this state, the rotation of the driving device 11 of the yaw axis assembly 1 may be limited to avoid the situation where the driving axis assembly cannot rotate or rotates uncontrollably, and the controller 4 may control the motion of the gimbal in the two-axis mode. When the joint angle is outside of the predetermined range, all of the driving axis assemblies may operate normally. The controller 4 may restore the normal control of the yaw axis assembly 1, and may control the motion of the gimbal in the three-axis mode, such that better control and compensation may be provided to the position of the load 5.

In some embodiments, the angle sensor 21 for obtaining the joint angle of the driving device of the roll axis assembly 2 may be any touch or non-touch sensors, such as an angle encoder, a Hall effect sensor, or a potentiometer.

In some embodiments, when the gimbal rotates, if the rotation angle of the driving axis assembly reaches 90 degrees, the universal joint tends to be deadlocked. So, the predetermined value range may include 90 degrees. In some embodiments, the predetermined value range may be set to be different based on the actual structural characteristics of the driving axis assembly, as long as the predetermined value range includes 90 degrees.

In some embodiments, the predetermined value may range from 70 degrees to 110 degrees. Based on a determination that the driving device of the roll axis assembly 2 has rotated to a joint angle to be within the predetermined value range, the controller 4 may control the gimbal to limit the rotation of the driving device of the pitch axis assembly 3, and may control the gimbal in a two-axis mode.

In some embodiments, the predetermined value may have an allowable variation of ±5 degrees. That is, the predetermined value of the angle may be adjusted up or down for 5 degrees based on the actual structure of the driving axis assembly or a user's needs, when implemented in different structures and application scenes.

In some embodiments, based on a detection or determination that the joint angle of the driving device of the roll axis assembly 2 is within the predetermined value range, the rotation of the driving device 11 of the yaw axis assembly 1 may be limited. An independent servo control may be applied to the yaw axis assembly using devices such as inertial measurement units, such that the yaw axis assembly may independently compensate for the motion of the load. In some embodiments, the yaw axis assembly 1 may include an inertial measurement unit 15. The inertial measurement unit 15 may be configured to detect an angle and an acceleration of the yaw axis using inertial principles, thereby providing real time attitude information of the yaw axis assembly 1 to the controller 4. In some embodiments, the inertial measurement unit 15 may be disposed on the driving device 11 of the yaw axis assembly 1.

In some embodiments, the attitude of the yaw axis assembly 1 of the gimbal may be obtained and controlled based on an independently provided inertial measurement unit 15, and the motion compensation and attitude control of the roll axis assembly 2 and the pitch axis assembly 3 may be performed using a control system of the gimbal. As a result, the controller 4 may independently control the yaw axis assembly 1 and other two driving axis assemblies, thereby maintaining the load 5 at a forwarding facing position when rotating.

In some embodiments, the inertial measurement unit 15, the controller 4, and the driving device 11 of the yaw axis assembly 1 may form a closed-loop control system. The closed-loop control system may be configured to adjust the rotation of the yaw axis assembly 1 relative to other elements in real time. For example, the angle detected by the inertial measurement unit 15 may be used as a feedback and provided to the controller 4, such that the controller 4 may control the rotation angle of the driving device 11 of the yaw axis assembly 1 in a closed-loop control.

In some embodiments, in the closed-loop system, the controller 4 may adjust the driving device 11 of the yaw axis assembly 1 in real time based on the feedback provided by the inertial measurement unit 15, such that the driving device 11 of the yaw axis assembly 1 is maintained in a stable state, and in a corresponding angle and attitude.

In some embodiments, through configuring the inertial measurement unit 15, the rotation angle of the driving device 11 of the yaw axis assembly 1 may be detected. The rotation of the driving axis assembly may be controlled in real time based on a result of the detection, such that during a rotation of the load 5 of the gimbal, the load 5 may receive suitable motion compensation and may be maintained in a stable attitude.

In some embodiments, for the convenience of handholding the gimbal, the gimbal may include a handle assembly 6. The handle assembly 6 may be rotatably coupled with the yaw axis assembly 1 through the driving device 11 of the yaw axis assembly 1. The user may carry the gimbal by handholding the handle assembly 6.

In some embodiments, for the convenience of carrying the gimbal using one hand or both hands, the handle assembly 6 may include a supporting rod 61, a handholding rod 62 disposed at two ends of the supporting rod 61, and a handle 63 disposed at a middle portion of the supporting rod 61. The handle 63 may be located adjacent the driving device 11 of the yaw axis assembly 1. When the user handholds the gimbal, the user may use both hands to hold the handholding rod 62, or may carry the handle 63 using one hand, to hold and operate the gimbal.

In the above descriptions, for illustration purposes, the controller 4 is described as limiting one of the driving axis assemblies of the gimbal. In actual implementations, the controller 4 may limit the rotations of two driving axis assemblies of the three driving axis assemblies, to avoid the uncontrollable rotation of a driving axis assembly. The methods for limiting the rotations of the two driving axis assemblies may be similar to the above method for limiting the rotation of one driving axis assembly.

In some embodiments, the gimbal is configured to support the load. The gimbal includes at least three rotatably coupled driving axis assemblies. Each driving axis assembly may include a driving device and a joint arm driven by the driving device. The joint arm may rotate when driving by the driving device. The gimbal may also include a controller configured to control a rotation of at least one driving axis assembly of the gimbal during the rotation of the gimbal, and to control the gimbal to move in different modes. As such, when the gimbal undergoes a relatively large adjustment to its attitude, such as when the position of the load is adjusted from a position below the gimbal in a portable suspension state to a position above the gimbal in an upside down inverted state, the gimbal may still maintain normal rotations, and may avoid uncontrollable rotations that may occur to the driving axis assemblies, thereby maintaining the forward facing attitude and position of the load.

Figure 6:
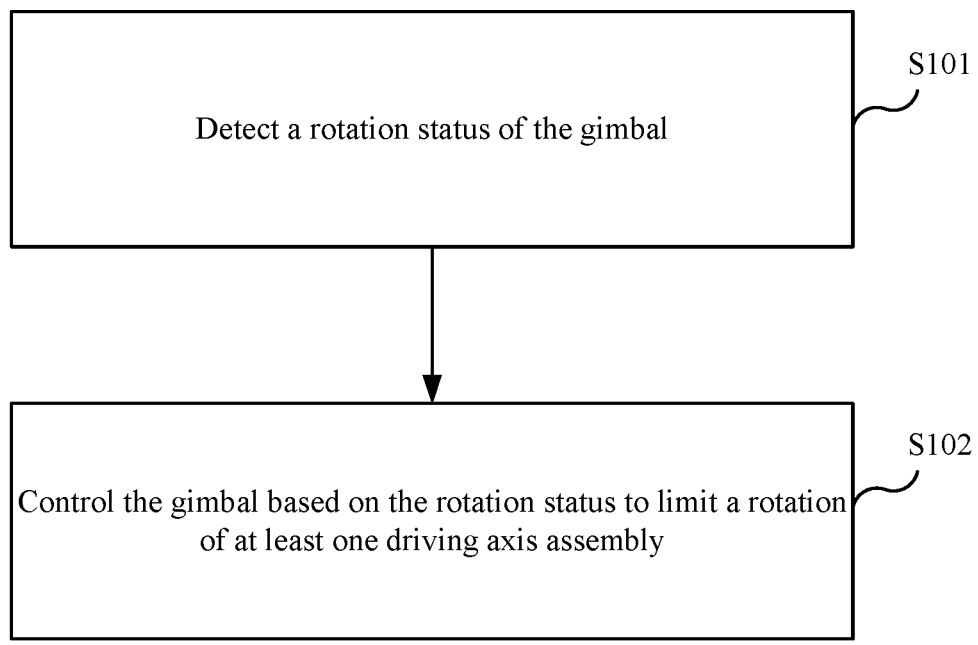
FIG. 6 is a flow chart illustrating a gimbal control method, according to an example embodiment.

FIG. 6 is a flow chart illustrating a gimbal control method. The gimbal control method may be implemented on any gimbal disclosed herein. The gimbal control method may maintain the gimbal in a normal operation state when the load of the gimbal rotates in a relatively large range. As shown in FIG. 6, the gimbal control method may include the following steps:

Step S101: detecting a rotation status of the gimbal.

In some embodiments, the gimbal may be configured to support a load. The load may be an imaging device or other device that may use the gimbal to stabilize its attitude. To meet different application scenes, a user may handhold the gimbal, and may adjust the position of the load from a position below the gimbal in a portable suspension state to a position above the gimbal in an upside down inverted state. To enable the load to rotate in a large range, the rotation status of the gimbal may be detected, such that a controller may select a corresponding control strategy based on the rotation status of the gimbal to control the rotation of each driving axis assembly in the gimbal. In some embodiments, the rotation status of the gimbal may include whether the gimbal is in a rotation process, and the real time attitude of the gimbal, etc.

Step S102: controlling the gimbal based on the rotation status to limit a rotation of at least one driving axis assembly.

In some embodiments, after obtaining the rotation status, the controller may control the rotation of each driving axis assembly based on the rotation status, and may limit the rotation of at least one driving axis assembly. In some embodiments, when the load rotates with a large angle, in the driving axis assemblies of the gimbal, a rotation axis of a driving axis assembly may coincide or substantially coincide with a rotation axis of another driving axis assembly, i.e., the joint angle of the driving device of the driving axis assembly may be close to or at 90 degree. In this state, the gimbal cannot determine the motion attitude and motion trend of the driving axis assembly, which may cause the driving axis assembly unable to rotate or may cause the driving axis assembly to experience uncontrollable rotation. Therefore, the controller of the gimbal may control the rotation of each driving axis assembly based on the rotation status of the gimbal, to limit the rotation of at least one driving axis assembly of the driving axis assemblies. As a result, the gimbal may maintain normal rotations when the attitude is adjusted in a relatively large range, thereby avoiding the uncontrollable rotation that may occur to the driving axis assembly.

In some embodiments, the gimbal may include a yaw axis assembly, a roll axis assembly, and a pitch axis assembly. As described above, the yaw axis assembly, the roll axis assembly, and the pitch axis assembly may be rotatably coupled in the described sequence. The load may be supported by the joint arm of the pitch axis assembly. Correspondingly, during the rotation of the gimbal, controlling the gimbal based on the rotation status to limit the rotation of at least one driving axis assembly may include, during the rotation of the gimbal, controlling the gimbal to limit the rotation of the driving device of the yaw axis assembly.

In some embodiments, when the position of the load is adjusted from a position below the gimbal in a portable suspension state to a position above the gimbal in an upside down inverted state, the load may rotate around the roll axis. The rotation angle of the roll axis assembly may be close to or may exceed 180 degrees. To avoid the deadlock of a universal joint when the joint angle of the driving device of the roll axis assembly reaches 90 degrees, the rotation of the yaw axis assembly may be limited, and the gimbal may be controlled to move in a two-axis mode. When the driving device of the yaw axis assembly is limited, the gimbal is changed from an original three-axis gimbal formed by the yaw axis assembly, the roll axis assembly, and the pitch axis assembly to a two-axis gimbal in which only the rotatable roll axis assembly and the pitch axis assembly can rotate. In the two-axis gimbal operation mode, because the roll axis assembly and the pitch axis assembly can rotate only around two axes, the two axes cannot coincide with one another. Therefore, uncontrollable rotation caused by the deadlock of the universal joint can be avoided, thereby maintaining the normal rotations of the gimbal.

In some embodiments, various methods may be used to limit the rotation of the yaw axis assembly. For example, a locking mechanism may be provided on the controller to mechanically lock the joint arm or the driving device of the yaw axis assembly. In some embodiments, the controller may independently provide motion compensation to the yaw axis assembly and independently control the yaw axis assembly, such that the yaw axis assembly is maintained in a stable, fixed position.

Figure 7:
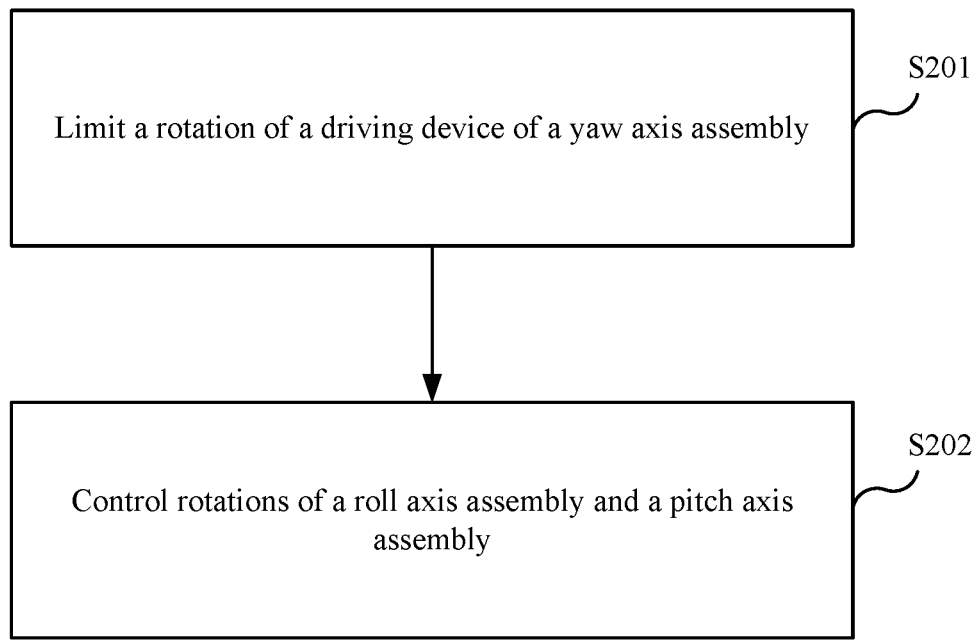
FIG. 7 is a flow chart illustrating steps included in the gimbal control method for limiting a rotation of a driving device of a yaw axis assembly, according to an example embodiment.

FIG. 7 is a flow chart illustrating steps for limiting the rotation of the driving device of the yaw axis assembly that may be included in a gimbal control method. As shown in FIG. 7, when a physical locking mechanism is used to mechanically lock the yaw axis assembly, controlling the gimbal to limit the rotation of the driving device of the yaw axis assembly may include the following steps:

Step S201: limiting a rotation of a driving device of a yaw axis assembly.

In some embodiments, when a locking mechanism is used to mechanically lock the driving device of the yaw axis assembly, a user may manually lock the driving device, or the controller may trigger the locking mechanism to automatically lock the driving device, thereby limiting the rotation of the driving device of the yaw axis assembly. The locking mechanism may have various structures and forms, which have been described above.

In some embodiments, to limit the yaw axis assembly, step S201 may also include controlling the rotation of the driving device of the yaw axis assembly when the gimbal starts to rotate. Thus, when the gimbal starts to rotate, the locking mechanism of the controller may lock the driving device of the yaw axis assembly to limit the rotation of the driving device of the yaw axis assembly. The disclosed control method is simple and reliable.

In some embodiments, when limiting the rotation of the driving device of the yaw axis assembly, the controller may directly control the driving device of the yaw axis assembly to stop rotation.

Step S202: controlling rotations of a roll axis assembly and a pitch axis assembly.

In some embodiments, because the rotation of the yaw axis assembly is limited, the controller may adopt a two-axis gimbal operation mode to control the rotations of the roll axis assembly and the pitch axis assembly. When the rotation of the load is maintained, the gimbal can perform normal rotations to compensate for the rotation of the load, to maintain the attitude of the load.

Figure 8:
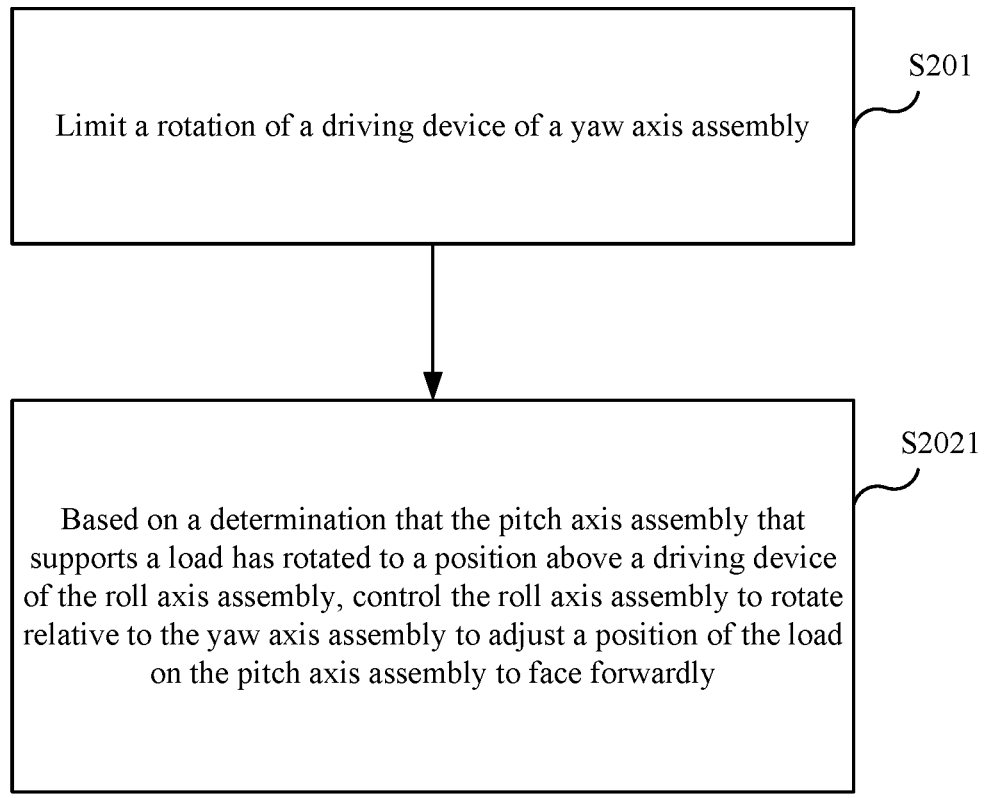
FIG. 8 is a flow chart illustrating steps included in the gimbal control method for limiting a rotation of a driving device of a yaw axis assembly, according to another example embodiment.

FIG. 8 is a flow chart illustrating steps of a gimbal control method for limiting the rotation of the driving device of the yaw axis assembly. As shown in FIG. 8, after Step S201, controlling the rotations of the roll axis assembly and the pitch axis assembly may include:

Step S2021: based on a determination that the pitch axis assembly that supports a load has rotated to a position above a driving device of the roll axis assembly, controlling the roll axis assembly to rotate relative to the yaw axis assembly to adjust a position of the load on the pitch axis assembly to face forwardly.

In some embodiments, when the user changes the position of the load, to control the position and attitude of the load, the controller may control the rotations of the roll axis assembly to rotate relative to the yaw axis assembly, to adjust the position of the load supported by the pitch axis assembly to a forward facing position. The forward facing position of the load refers to the position and attitude of the load under a normal operating condition. Because the roll axis assembly rotates relative to the yaw axis assembly, when the load rotates around the roll axis assembly, the roll axis assembly may suitably compensate for the rotation of the load, such that the load is maintained at the forward facing position. For example, when the load is an imaging device, through the rotation of the roll axis assembly, the imaging device may capture upright oriented images or videos.

Figure 9:
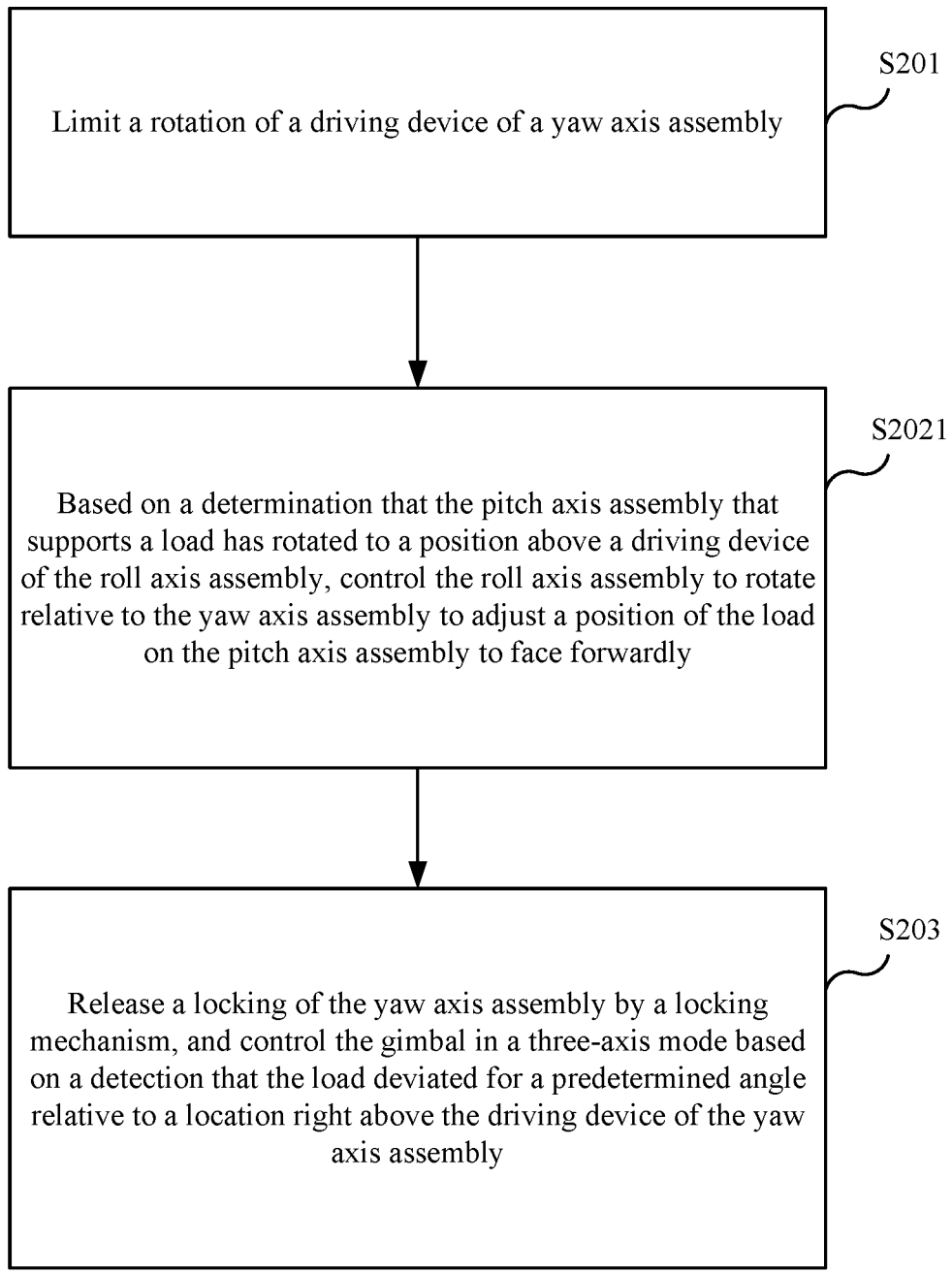
FIG. 9 is a flow chart illustrating steps included in the gimbal control method for limiting a rotation of a driving device of a yaw axis assembly, according to another example embodiment.

FIG. 9 is a flow chart illustrating steps of a gimbal control method for limiting the rotation of the driving device of the yaw axis assembly. As shown in FIG. 9, after steps S201 and S2021, the method may further include:

Step S203: releasing a locking of the yaw axis assembly by a locking mechanism, and controlling the gimbal in a three-axis mode based on a detection that the load deviated for a predetermined angle relative to a position right above the driving device of the yaw axis assembly.

In some embodiments, when the load rotates to a position right above the driving device of the yaw axis assembly, or when the rotation is completed, to restore the three-axis control mode, the limitation on the rotation of the driving device of the yaw axis assembly may be released by, e.g., releasing the locking of the locking mechanism on the yaw axis assembly. In this state, if the rotation angle of the driving device of the yaw axis assembly as obtained by the angle sensor is greater than or equal to a predetermined angle, the control of the yaw axis assembly may be restored, such that the gimbal is controlled in the three-axis mode.

In some embodiments, the predetermined angle may be 5 degrees. When the load deviates in any direction for 5 degrees relative to the position right above the driving device of the yaw axis assembly, the controller may control the gimbal to release the limitation on the rotation of the driving device of the yaw axis assembly.

In some embodiments, limiting the rotation of the yaw axis assembly using the locking mechanism, and limiting the rotation of the driving device of the yaw axis assembly at the start of the gimbal rotation may be performed by manual operations. Alternatively or additionally, limiting the rotation of the driving device of the yaw axis assembly may be triggered by the controller. The disclosed methods for limiting the rotation are simple and reliable, and are convenient to implement.

In some embodiments, the angle sensor may be configured to detect the motion status of the gimbal. As compared to the method of limiting the rotation of the driving device of the yaw axis assembly at the start of a gimbal rotation, this embodiment may provide real time detection of the rotation angle of the gimbal as the gimbal moves. In some embodiments, the step of detecting the rotation status of the gimbal may include detecting a joint angle of the driving device of the roll axis assembly using an angle sensor included in the roll axis assembly. Correspondingly, during the rotation of the gimbal, controlling the gimbal to limit the rotation of the driving device of the yaw axis assembly may include:

controlling the rotation of the driving device of the yaw axis assembly when the joint angle is within a predetermined value range.

In some embodiments, the roll axis assembly may include an independent angle sensor configured to obtain or detect the joint angle of the driving device of the roll axis assembly, such that the controller may limit the rotation of the driving device of the yaw axis assembly based on the joint angle. When the joint angle detected by the angle sensor is within the predetermined value range, it may indicate that the driving axis assembly has rotated to an angle in a range that may cause the deadlock of a universal joint. In this state, the rotation of the driving device of the yaw axis assembly may be limited to avoid the situation where the driving axis assembly cannot rotate or to avoid uncontrollable rotations. In this state, the controller may control the motion of the gimbal in a two-axis mode. When the joint angle is outside of the predetermined value range, all of the driving axis assemblies may be operating normally, and the controller may restore the normal control of the yaw axis assembly. The gimbal may be controlled in a three-axis mode, which may provide better control and compensation to the position of the load. The angle sensor for detecting the joint angle of the driving device of the roll axis assembly may include any suitable touch or non-touch sensors, such as an angle encoder, a Hall effect sensor, or a potentiometer, etc.

In some embodiments, when the gimbal rotates, if the rotation angle of the driving axis assembly reaches 90 degrees, a universal joint may be deadlocked. So, the predetermined value range may include 90 degrees.

In some embodiments, the predetermined value may range from 70 degrees to 110 degrees. When the joint angle of the driving device of the roll axis assembly is within the predetermined value range, the rotation of the driving device of the yaw axis assembly may be limited to avoid the deadlock of the universal joint.

In some embodiments, the predetermined value may deviate±5 degrees, which may be adjusted based on the specific structure of the driving axis assembly and the implementation scene.

In some embodiments, similar to the steps shown in FIG. 7, when the angle sensor included in the roll axis assembly detects the joint angle of the driving device of the roll axis assembly, and when controlling the gimbal to limit the rotation of the driving device of the yaw axis assembly, such steps may include other steps such as limiting the rotation of the driving device of the yaw axis assembly and controlling the rotations of the roll axis assembly and the pitch axis assembly.

In some embodiments, after step S201, controlling the rotation of the roll axis assembly and the pitch axis assembly may include: controlling the rotation of the roll axis assembly relative to the yaw axis assembly when the pitch axis assembly that supports the load rotates to a position right above the driving device of the yaw axis assembly, to adjust the position of the load on the pitch axis assembly to a forward facing position. Detailed steps may refer to the steps discussed above in connection with FIG. 8.

Figure 10:
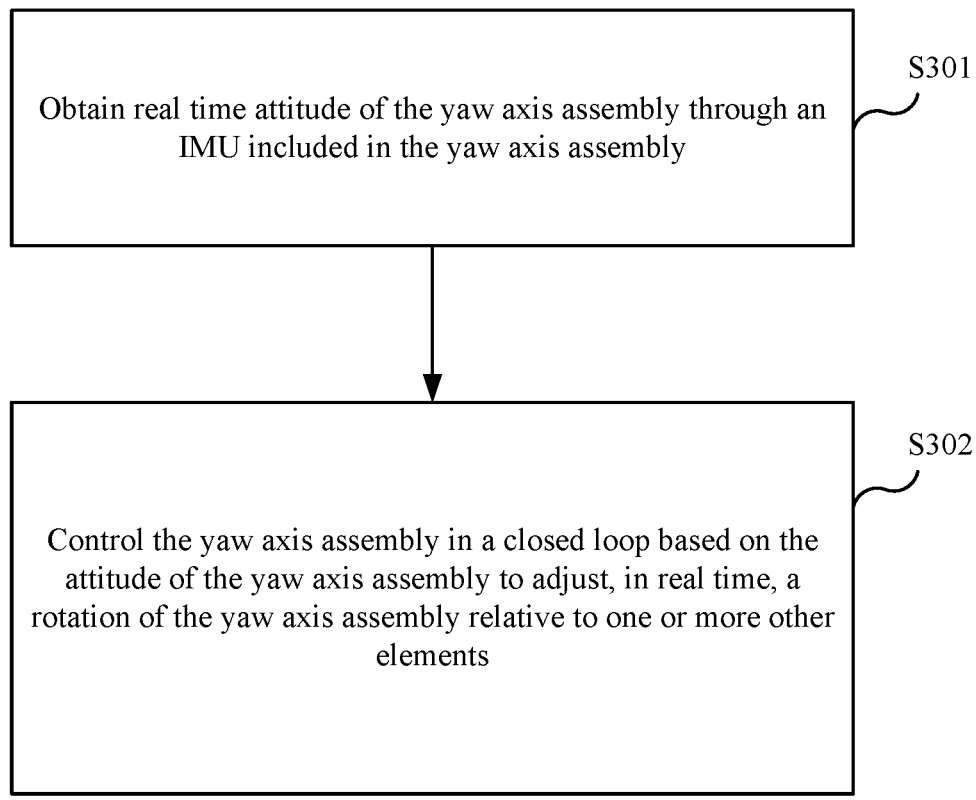
FIG. 10 is a flow chart illustrating steps included in the gimbal control method for limiting a rotation of a driving device of a yaw axis assembly, according to another example embodiment.

FIG. 10 is a flow chart illustrating steps included in a gimbal control method for limiting the rotation of the driving device of the yaw axis assembly. As shown in FIG. 10, limiting the rotation of the driving device of the yaw axis assembly may include:

Step S301: obtaining real time attitude of the yaw axis assembly through an IMU included in the yaw axis assembly.

In some embodiments, the IMU independently provided on the yaw axis assembly may measure the angle and acceleration of the yaw axis based on inertial principles, and may therefore obtain the attitude of the yaw axis assembly in real time and provided a feedback to the controller. The IMU may be provided on the driving device of the yaw axis assembly.

Step S302: controlling the yaw axis assembly in a closed loop based on the attitude of the yaw axis assembly to adjust, in real time, a rotation of the yaw axis assembly relative to one or more other elements.

In some embodiments, obtaining and controlling the attitude of the yaw axis assembly in the gimbal may be performed through the independently provided IMU. The motion compensation and attitude control of the roll axis assembly and the pitch axis assembly may be performed through the IMU provided on the load or other control system. Thus, the controller may control the yaw axis assembly and the other two driving axis assemblies independently, and controller 4 may control the motion of the gimbal in a two-axis mode, thereby maintaining the load in a forward facing position during rotation. The controller, the yaw axis assembly, and the IMU may form a closed-loop system for performing closed-loop control.

In some embodiments, step S302 may include: adjusting, in real time, the driving device of the yaw axis assembly based on the feedback provided by the IMU to maintain a stable state for the driving device of the yaw axis assembly. Thus, the IMU may provide a feedback to the closed-loop system, which may compensate for the rotation angle of the driving device of the yaw axis assembly to maintain a stable state for the driving device of the yaw axis assembly.

By configuring the IMU, the rotation angle of the driving device of the yaw axis assembly may be detected. The rotation of the driving axis assembly may be controlled in real time based on the detection result, such that during the rotation of the load, the gimbal may achieve a suitable motion compensation and a stable attitude.

In some embodiments, the gimbal control method may include the following steps: detecting the rotation status of the gimbal, and controlling the gimbal to limit the rotation of at least one driving axis assembly based on the rotation status of the gimbal. As such, when the attitude of the gimbal is adjusted in a relatively large range, for example, when the position of the load is adjusted from a position below the gimbal in a portable suspension state to a position above the gimbal in an upside down inverted state, the gimbal may maintain normal rotations to avoid uncontrollable rotations that may occur to the driving axis assembly, thereby maintaining the load in a forward facing attitude and position.

A person having ordinary skill in the art can appreciate that part or all of the above disclosed methods and processes may be implemented using related electrical hardware under the instruction of computer program codes or instructions. The computer program may be stored in a computer-readable storage medium. When the program is executed, the above steps of the disclosed methods may be performed. The storage medium may include various non-transitory storage medium that may store computer codes or instructions, such as a read-only memory ("ROM"), a random access memory ("RAM"), a magnetic disk, or an optical disk.

A person having ordinary skill in the art can appreciate that the above embodiments are only examples of the present disclosure, and do not limit the scope of the present disclosure. Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Varia-

What is claimed is:

1. A gimbal for supporting a load, comprising:
at least three rotatably coupled driving axis assemblies, each driving axis assembly comprising a driving device and a joint arm configured to rotate when driven by the driving device; and
a controller configured to, based on a switch of the load from a first attitude to a second attitude that is opposite to the first attitude, control the gimbal to limit a rotation of a first driving axis assembly, and adjust positions of a second driving axis assembly and a third driving axis assembly, respectively, relative to the load, such that the gimbal maintains a forward orientation of the load.

2. The gimbal of claim 1, further comprising an electrical speed control configured to connect with the controller and the driving device, wherein the controller is configured to control an operation of the driving device through the electrical speed control.

3. The gimbal of claim 1, wherein:
the load is an imaging device, and the position of the load shifts between a position above the gimbal and a position below the gimbal.

4. The gimbal of claim 1, wherein the gimbal comprises three driving axis assemblies including a yaw axis assembly, a roll axis assembly, and a pitch axis assembly.

5. The gimbal of claim 4,
wherein the yaw axis assembly, the roll axis assembly, and the pitch axis assembly are rotatably connected in sequence,
wherein the load is supported by a joint arm of the pitch axis assembly, and
wherein the controller is configured to control the gimbal to limit a rotation of a driving device of the yaw axis assembly during the rotation of the gimbal.

6. The gimbal of claim 5, wherein:
the controller is configured to control the roll axis assembly to rotate relative to the yaw axis assembly to adjust a position of the load on the pitch axis assembly to face forwardly; and
the pitch axis assembly supports the load and rotates to a position above the driving device of the yaw axis assembly during the rotation of the gimbal.

7. The gimbal of claim 6, further comprising a locking mechanism configured to lock a rotation of a joint arm of the yaw axis assembly driven by the driving device of the yaw axis assembly,
wherein the controller is configured to shut off the driving device of the yaw axis assembly and control the gimbal in a two-axis mode based on a determination by the controller that the joint arm of the yaw axis assembly is locked by the locking mechanism.

8. The gimbal of claim 6, wherein the controller is configured to release the limitation on the rotation of the driving device of the yaw axis assembly based on a determination by the controller that the load has rotated to a position right above the driving device of the yaw axis assembly.

9. The gimbal of claim 6,
wherein the yaw axis assembly comprises an angle sensor configured to detect a rotation angle of the driving device of the yaw axis assembly, and
wherein the controller is configured to control the gimbal in a three-axis mode based on a determination that an angle detected by the angle sensor is greater than or equal to a predetermined angle after the limitation on the rotation of the driving device of the yaw axis assembly is released.

10. The gimbal of claim 6,
wherein the roll axis assembly comprises an angle sensor, and
wherein the controller is configured to:
obtain a joint angle of a driving device of the roll axis assembly detected by the angle sensor of the roll axis assembly, and
control the gimbal to limit the rotation of the driving device of the yaw axis assembly and control the gimbal in a two-axis mode, based on a determination that the joint angle is within a predetermined value range.

11. The gimbal of claim 10, wherein the yaw axis assembly comprises an inertial measurement unit configured to obtain, in real time, an attitude of the yaw axis assembly and provide a feedback to the controller.

12. The gimbal of claim 11, wherein the inertial measurement unit, the controller, and the driving device of the yaw axis assembly form a closed-loop control system configured to adjust, in real time, a rotation of the yaw axis assembly.

13. The gimbal of claim 5, wherein a rotation angle of the yaw axis assembly relative to the roll axis assembly is greater than or equal to 360 degrees.

14. The gimbal of claim 5, further comprising a handle assembly configured to couple with the yaw axis assembly through the driving device of the yaw axis assembly.

15. The gimbal of claim 5, wherein the roll axis assembly does not coincide with the pitch axis assembly during the rotation of the gimbal.

16. The gimbal of claim 5, wherein the controller is further configured to directly receive an input commander from a user and control the driving device of the yaw axis assembly to stop rotation, to switch the gimbal to a two-axis mode.

17. The gimbal of claim 1, wherein the first attitude is one of an upright attitude and an inverted attitude, and the second attitude is another one of the upright attitude and the inverted attitude.

18. A gimbal control method, comprising:
detecting a rotation status of the gimbal, wherein the gimbal including three driving axis assemblies;
based on the rotation status indicating a switch of the load from a first attitude to a second attitude that is opposite to the first attitude, controlling the gimbal to limit a rotation of a first driving axis assembly, and adjust positions of a second driving axis assembly and a third driving axis assembly, respectively, relative to the load to maintain the gimbal in a forward orientation.

19. The method according to claim 18, wherein the detected rotation status includes a joint angle of the first driving axis assembly to be limited for rotation being within a predetermined value range.

20. A gimbal for supporting a load, comprising:
at least three rotatably coupled driving axis assemblies, each driving axis assembly comprising a driving device and a joint arm configured to rotate when driven by the driving device; and
a controller configured to control the gimbal to limit a rotation of a first driving axis assembly, and adjust positions of a second driving axis assembly and a third driving axis assembly, respectively, relative to the load, such that the gimbal maintains a forward orientation of the load;

wherein limiting the rotation of the first driving axis assembly includes:
controlling the gimbal to limit the rotation of the driving device of a yaw axis assembly and control the gimbal in a two-axis mode, based on a determination that a joint angle of a driving device of a roll axis assembly is within a predetermined value range.

\* \* \* \* \*